US011931798B2

(12) United States Patent
Lee et al.

(10) Patent No.: US 11,931,798 B2
(45) Date of Patent: Mar. 19, 2024

(54) TWO-SEGMENT ELECTROMAGNET SEMI-SOLID DIECASTING APPARATUS AND DIECASTING METHOD USING SAME

(71) Applicant: HANJOO LIGHT METAL CO., LTD., Ulsan (KR)

(72) Inventors: Yong-Jin Lee, Busan (KR); Jin-Ha Park, Ulsan (KR); Myung-Seong Kong, Ulsan (KR); Seong-Rak Park, Ulsan (KR); Joong-Suk Roh, Ulsan (KR)

(73) Assignee: HANJOO LIGHT METAL CO., LTD., Ulsan (KR)

( * ) Notice: Subject to any disclaimer, the term of this patent is extended or adjusted under 35 U.S.C. 154(b) by 0 days.

(21) Appl. No.: 18/268,703

(22) PCT Filed: Dec. 22, 2021

(86) PCT No.: PCT/KR2021/019603
§ 371 (c)(1),
(2) Date: Jun. 21, 2023

(87) PCT Pub. No.: WO2022/145862
PCT Pub. Date: Jul. 7, 2022

(65) Prior Publication Data

US 2024/0042517 A1 Feb. 8, 2024

(30) Foreign Application Priority Data

Jan. 4, 2021 (KR) ........................ 10-2021-0000191

(51) Int. Cl.
*B22D 17/30* (2006.01)
*B01F 33/451* (2022.01)
(Continued)

(52) U.S. Cl.
CPC ............ *B22D 17/30* (2013.01); *B01F 33/451* (2022.01); *B22D 17/002* (2013.01);
(Continued)

(58) Field of Classification Search
CPC .... B22D 17/30; B22D 17/002; B22D 17/007; B22D 17/08; B22D 17/203
See application file for complete search history.

(56) References Cited

FOREIGN PATENT DOCUMENTS

JP 05-309451 A 11/1993
JP 07-108355 A 4/1995
(Continued)

OTHER PUBLICATIONS

English machine translation of KR-20110102661-A (Year: 2011).*
(Continued)

*Primary Examiner* — Kevin P Kerns
*Assistant Examiner* — Steven S Ha
(74) *Attorney, Agent, or Firm* — Sughrue Mion, PLLC

(57) ABSTRACT

Disclosure provides a two-segment electromagnet stirring member, and a two-segment electromagnet semi-solid die-casting apparatus including the same, and a die-casting method using the same. The two-segment electromagnet stirring member includes a plurality of magnetic field generation parts therein, and includes a first electromagnetic stirring part and a second electromagnetic stirring part separated from each other. The first electromagnetic stirring part and the second electromagnetic stirring part are coupled to each other in a ring shape to surround an outer circumferential surface of a sleeve to perform electromagnetic stirring to molten metal in the sleeve, and are coupled to each other so as to position the plurality of magnetic field generation parts at radially equal gaps around the sleeve.

7 Claims, 6 Drawing Sheets

(51) Int. Cl.
*B22D 17/00* (2006.01)
*B22D 17/08* (2006.01)
*B22D 17/20* (2006.01)
*B01F 101/26* (2022.01)

(52) U.S. Cl.
CPC ........... *B22D 17/007* (2013.01); *B22D 17/08* (2013.01); *B22D 17/203* (2013.01); *B01F 2101/26* (2022.01)

(56) References Cited

FOREIGN PATENT DOCUMENTS

| | | | | |
|---|---|---|---|---|
| JP | 11-245012 | A | | 9/1999 |
| JP | 2010-167430 | A | | 8/2010 |
| KR | 10-2005-0064741 | A | | 6/2005 |
| KR | 10-0690058 | B1 | | 3/2007 |
| KR | 20110102661 | A | * | 9/2011 |
| KR | 10-2013-0009240 | A | | 1/2013 |
| KR | 10-2013-0041473 | A | | 4/2013 |
| KR | 10-1846747 | B1 | | 4/2018 |
| KR | 10-2019-0071146 | A | | 6/2019 |
| KR | 10-2020-0138545 | A | | 12/2020 |

OTHER PUBLICATIONS

Korean Office Action for KR 10-2021-0000191 dated Jun. 16, 2022.

Decision on Registration for KR 10-2021-0000191 dated Aug. 18, 2022.

International Search Report for PCT/KR2021/019603 dated Apr. 1, 2022.

* cited by examiner (a) (b)

TWO-SEGMENT ELECTROMAGNET SEMI-SOLID DIECASTING APPARATUS AND DIECASTING METHOD USING SAME

CROSS REFERENCE TO RELATED APPLICATIONS

This application is a National Stage of International Application No. PCT/KR2021/019603 filed Dec. 22, 2021, claiming priority based on Korean Patent Application No. 10-2021-0000191 filed Jan. 4, 2021, the entire disclosures of which are incorporated herein by reference.

TECHNICAL FIELD

The present disclosure relates to a two-segment electromagnet semi-solid die-casting apparatus and a die-casting method using the same. More particularly, the present disclosure relates to a two-segment electromagnet semi-solid die-casting apparatus and a die-casting method using the same, which are configured such that a two-segment electromagnet stirring member is movable and couplable in conjunction with movement of a mold and electromagnetic vibration is applied into molten metal in a sleeve to control the structure of the molten metal.

BACKGROUND ART

A semi-solid metal material exists a state in which liquid phase and spherical crystal grains are mixed in an appropriate ratio in a semi-solid temperature range, and may refer to as a metal material that can be deformed even with a small force due to a thixotropic property and have excellent fluidity so as to be easy to be processed by molding like a liquid phase. Since the semi-solid metal material generally has fluidity at a lower temperature than liquid metal, the temperature of an exposed casting equipment can be lowered than the temperature of the liquid metal, and thus the life of the casting equipment can extend. In addition, when the semi-solid metal material is extruded, since turbulence thereof is less generated than in the liquid state, the mixing of air during casting can be reduced, and with a semi-solid state, contraction during solidification is small. As a result, workability is improved, and a product can be reduced in weight, so that the semi-solid metal material can be applied to a new material molding field.

As one of the casting methods that can use a semi-solid metal material, semi-solid die-casting is a casting method in which molten metal is pressed into a mold having a predetermined hollow part shape and casted by being pressurized until the molten metal is solidified. As a representative example of the semi-solid die-casting, there is a horizontal die clamping vertical shot squeeze casting (HVSC) method in which a sleeve injected with molten metal is inserted through a lower part of the mold.

As a method of performing structure control of the semi-solid molten metal by applying electromagnetic stirring to the above-described semi-solid die-casting apparatus to generate an electromagnetic field into the molten metal, the technique in which an electromagnetic induction coil is provided on an outer circumferential surface of a sleeve has been disclosed in Japanese Patent Application Publication No. 11-245012.

However, when the electromagnetic induction coil is provided on the outer circumferential surface of the sleeve and the sleeve is docked to the mold, a portion or more of the electromagnetic induction coil is inserted into the mold, and the electromagnetic induction coil may be damaged by the mold during the process. As such, a problem may occur with electromagnetic application for controlling the structure of the molten metal, which may affect the quality of castings. In addition, since the electromagnetic induction coil should be replaced for each replacement of the sleeve, a problem of increasing process cost may occur.

DOCUMENT OF RELATED ART (Patent Document 0001) Japan Patent Application Publication No. 11-245012 (Date of Publication: Sep. 14, 1999)
(Patent Document 0002) Korean Patent No. 10-0690058 (Date of Registration: Feb. 26, 2007)

DISCLOSURE

Technical Problem

Accordingly, the present disclosure has been made keeping in mind the above problems occurring in the related art, and the present disclosure is intended to propose a two-segment electromagnet semi-solid die-casting apparatus and a die-casting method using the same, which are configured to prevent impacts and damages to a two-segment electromagnet stirring member during coupling and separating of a sleeve and a mold and to efficiently provide electromagnetic vibrations to molten metal in the sleeve to control the structure of the molten metal.

Another objective of the present disclosure is to provide a two-segment electromagnet semi-solid die-casting apparatus and a die-casting method using the same, which are configured to improve an injection process by providing a two-segment electromagnet stirring member which is operated in conjunction with a movable mold and a fixed mold, regardless of replacement of a sleeve.

The objective of the present disclosure is not limited to the above-described objectives, and other objectives of the present disclosure not mentioned will be clearly understood by those skilled in the art from the subsequent description.

Technical Solution

In order to solve the above problems, the present disclosure may provide a two-segment electromagnet stirring member including a plurality of magnetic field generation parts therein, and including a first electromagnetic stirring part and a second electromagnetic stirring part separated from each other, wherein the first electromagnetic stirring part and the second electromagnetic stirring part may be coupled to each other in a ring shape to surround an outer circumferential surface of a sleeve to perform electromagnetic stirring to molten metal in the sleeve, and be coupled to each other so as to position the plurality of magnetic field generation parts at radially equal gaps around the sleeve.

In order to solve the above problems, the present disclosure may provide a two-segment electromagnet semi-solid die-casting apparatus including: a mold member comprising a movable mold and a fixed mold; an injection member including a sleeve and a plunger and configured to inject molten metal into the mold member; and a two-segment electromagnet stirring member including a first electromagnetic stirring part and a second electromagnetic stirring part, the first electromagnetic stirring part being located at one end of the movable mold and being configured to be moved in conjunction with the movable mold and the second electromagnetic stirring part being located at one end of the fixed mold, wherein the first electromagnetic stirring part may be configured to be moved with movement of the movable mold to be coupled to the second electromagnetic stirring part to surround an outer circumferential surface of the sleeve, and the two-segment electromagnet stirring member may be configured to perform electromagnetic stirring to the molten metal located in the sleeve.

The two-segment electromagnet stirring member may include a cover part, the cover part being configured to protect the first electromagnetic stirring part and the second electromagnetic stirring part from outside space after a product is ejected from the mold member.

The two-segment electromagnet stirring member may include a cover part, the cover part being configured to protect the first electromagnetic stirring part and the second electromagnetic stirring part from outside space after a product is ejected from the mold member.

The injection member may be rotated at a predetermined angle and thus the sleeve may be tilted, and after the molten metal is injected into the tilted sleeve, the injection member may stand upright and be inserted into the mold member through a lower end of the mold member.

In order to solve the above problems, the present disclosure may provide a two-segment electromagnet semi-solid die-casting method including: injecting molten metal into a sleeve of an injection member; moving and coupling a movable mold of a mold member to a fixed mold, and allowing a first electromagnetic stirring part located at one end of the movable mold to be moved in conjunction with the movable mold to couple the first electromagnetic stirring part to a second electromagnetic stirring part located at one end of the fixed mold, thereby forming a ring-shaped two-segment electromagnet stirring member having a hollow portion; inserting the sleeve into the mold member through a lower portion of the mold member while passing through the hollow portion of the two-segment electromagnet stirring member, and allowing the two-segment electromagnet stirring member located to surround an outer circumferential surface of the sleeve to perform electromagnetic stirring to the molten metal; and injecting the electromagnetic stirred molten metal into the mold member as a plunger is moved.

The coupling of the first electromagnetic stirring part and the second electromagnetic stirring part may be performed by positioning a plurality of magnetic field generation parts at radially equal gaps around the sleeve.

The two-segment electromagnet semi-solid die-casting method may include: ejecting a product from the mold member and cleaning the movable mold and the fixed mold, and coating a releasing agent, wherein before the cleaning of the movable mold and the fixed mold or the coating with the releasing agent, the method may include: moving a cover part to outside space of the first electromagnetic stirring part and the second electromagnetic stirring part to protect the two-segment electromagnet stirring member.

The injecting of the molten metal into the sleeve of the injection member may be performed by rotating the injection member at a predetermined angle to tilt the sleeve, and injecting the molten metal into the tilted sleeve and then allowing the injection member to stand upright.

Advantageous Effects

According to the embodiment of the present disclosure, the two-segment electromagnet semi-solid die-casting apparatus and the die-casting method using the same can prevent impacts and damages to the two-segment electromagnet stirring member when the sleeve is coupled to and separated from the mold member and can efficiently provide electromagnetic vibrations into the molten metal located in the sleeve to control the structure of the molten metal.

Furthermore, the first electromagnetic stirring part and the second electromagnetic stirring part are respectively located at the lower portions of the movable mold and the fixed mold and thus the two-segment electromagnet stirring member operated in conjunction with mold closure and mold opening of the movable mold and the fixed mold. Accordingly, the two-segment electromagnet stirring member can be coupled to or separated from each other regardless of replacement of the sleeve, so that maintenance can be easily performed and the injection process can be improved.

MODE FOR INVENTION

Figure 1:
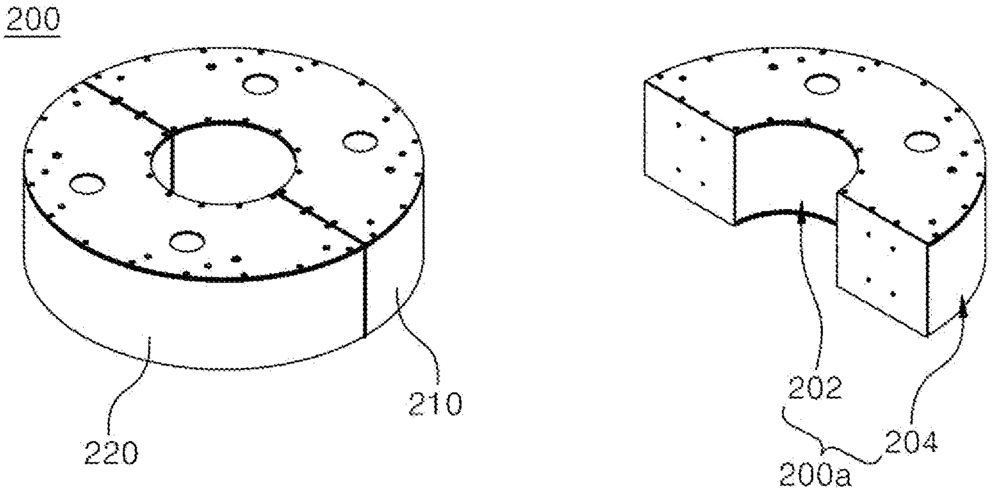
FIG. 1 is a perspective view showing coupling and separating of a two-segment electromagnet stirring member according to an embodiment of the present disclosure.

Hereinbelow, exemplary embodiments of the present disclosure will be described in detail with reference to accompanying drawings. Embodiments introduced below are provided as examples so that the spirit of the present disclosure can be sufficiently conveyed to those who are ordinarily skilled in the art. Therefore, the present disclosure is not limited to the embodiments described below and may be embodied in other forms. Furthermore, in the drawings, lengths, thicknesses, etc. of layers and regions may be exaggerated for convenience description. Throughout the specification, the same reference numerals will refer to the same or like parts.

Figure 2:
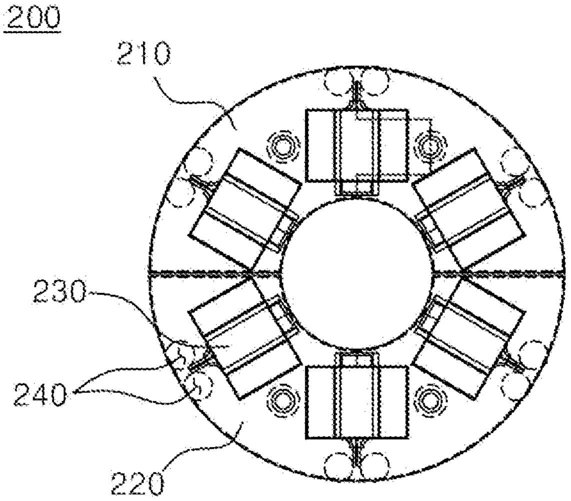
FIG. 2 is a top view showing the coupling of the two-segment electromagnet stirring member according to the embodiment of the present disclosure.
Figure 3:
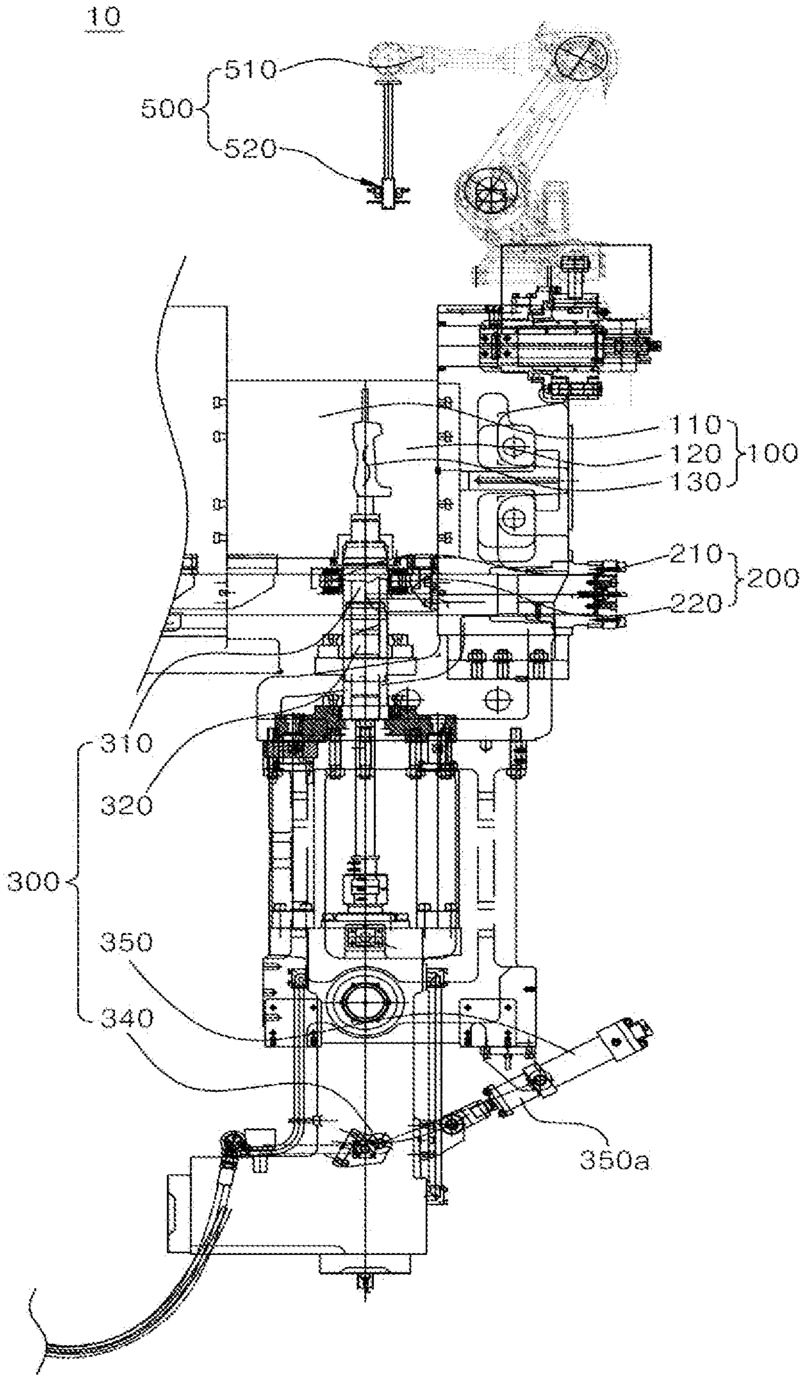
FIG. 3 is a side view showing docking of a sleeve of a two-segment electromagnet semi-solid die-casting apparatus according to the embodiment of the present disclosure.
Figure 4:
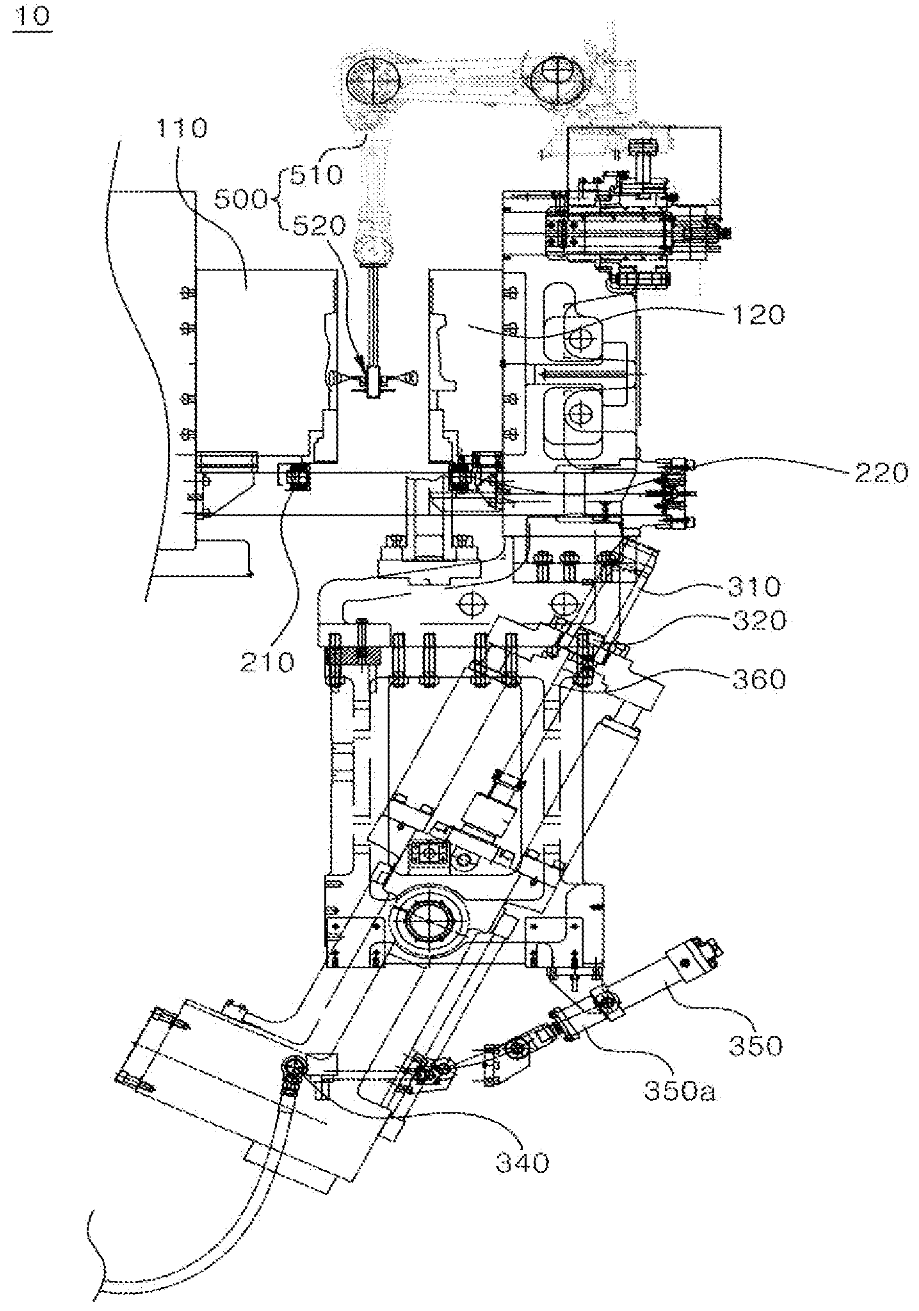
FIG. 4 is a side view showing undocking of the sleeve of the two-segment electromagnet semi-solid die-casting apparatus according to the embodiment of the present disclosure.
Figure 5:
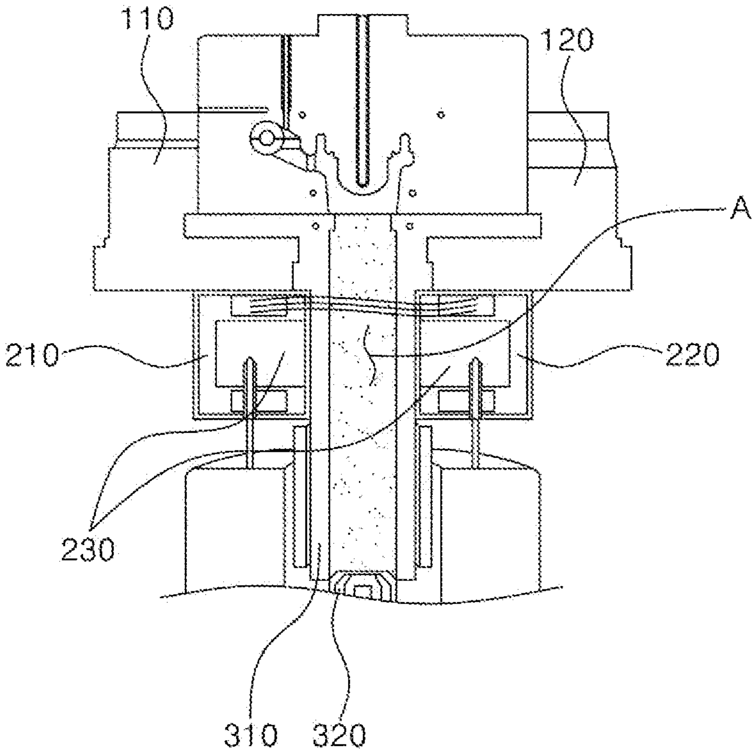
FIG. 5 is a sectional view showing stirring of molten metal of the two-segment electromagnet semi-solid die-casting apparatus according to the embodiment of the present disclosure.
Figure 9:
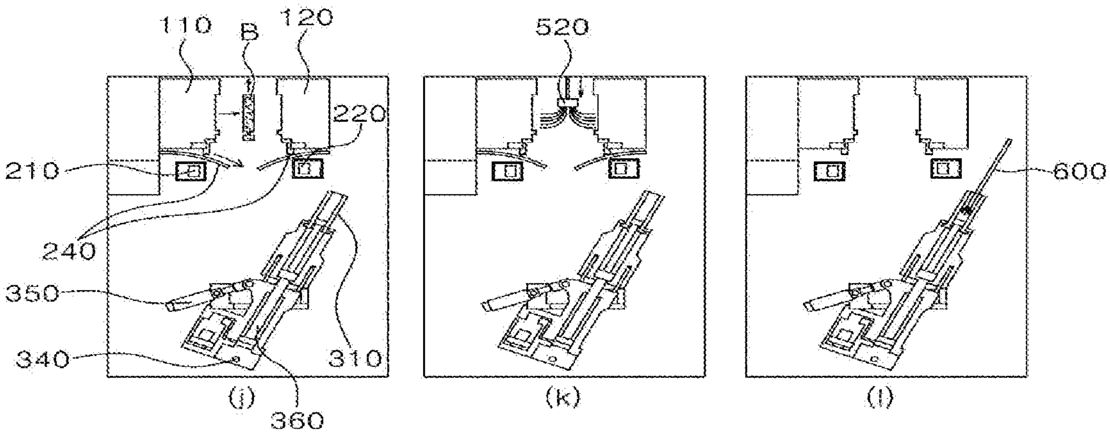
Figure 10:
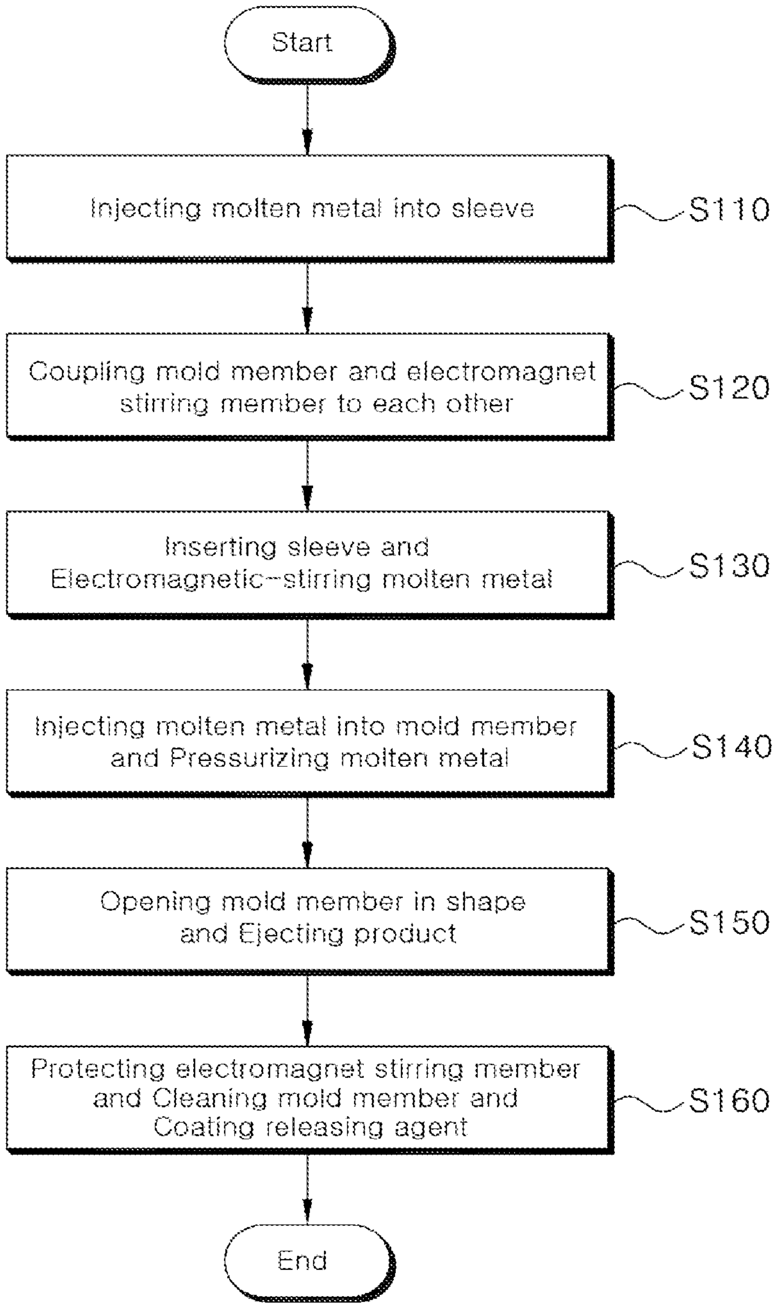
FIG. 10 is a process flowchart showing a two-segment electromagnet semi-solid die-casting method according to an embodiment of the present disclosure.

FIG. 1 is a perspective view showing coupling and separating of a two-segment electromagnet stirring member according to an embodiment of the present disclosure. FIG. 2 is a top view showing the coupling of the two-segment electromagnet stirring member according to the embodiment of the present disclosure. FIG. 3 is a side view showing docking of a sleeve of a two-segment electromagnet semi-solid die-casting apparatus according to the embodiment of the present disclosure. FIG. 4 is a side view showing undocking of the sleeve of the two-segment electromagnet semi-solid die-casting apparatus according to the embodiment of the present disclosure. FIG. 5 is a sectional view showing stirring of molten metal of the two-segment electromagnet semi-solid die-casting apparatus according to the embodiment of the present disclosure. FIGS. 6 to 9 are sectional views showing a two-segment electromagnet semi-solid die-casting process according to an embodiment of the present disclosure. FIG. 10 is a process flowchart showing a two-segment electromagnet semi-solid die-casting method according to an embodiment of the present disclosure.

Referring to FIGS. 1 to 5, according to an embodiment of the present disclosure, a two-segment electromagnet stirring member 200 includes a plurality of magnetic field generation parts 230 therein and may be provided to be divided into a first electromagnetic stirring part 210 and a second electromagnetic stirring part 220. The first electromagnetic stirring part 210 and the second electromagnetic stirring part 220 are coupled to each other in a ring shape to surround an outer circumferential surface of the sleeve to perform electromagnetic stirring to the molten metal in the sleeve, and are coupled to each other to locate the magnetic field generation parts 230 at the radially equal gaps around the sleeve.

As the first electromagnetic stirring part 210 and the second electromagnetic stirring part 220 of the ring-shaped two-segment electromagnet stirring member 200 having a hollow portion at the center portion are coupled to each other, a casing 200*a* of the two-segment electromagnet stirring member 200 may be provided. The casing 200*a* may be formed in a ring shape including an inner wall 202 into which a sleeve 310 of an injection member 300 is inserted and an outer wall 204 spaced apart from the inner wall 202. Furthermore, in order to protect the plurality of magnetic field generation parts 230 located in the casing 200*a* from the outside space, the casing 200*a* may have a structure in which all of upper and lower portions of regions between the inner wall and the outer wall and coupling surfaces of the first electromagnetic stirring part 210 and the second electromagnetic stirring part 220 are sealed, and the casing 200*a* may be formed of a non-magnetic material in order not to affect a magnetic field formed by the magnetic field generation parts 230. Moreover, the periphery of the magnetic field generation parts 230, for example, a cooling passage hole 240 is located in an internal part of the outer wall 204 to provide a passage of a hose through which a coolant is moved, so that overheating of the magnetic field generation parts 230 may be prevented. In some cases, the cooling passage hole 240 may serve as the passage through which a power cable providing power of the magnetic field generation parts 230 passes.

Each of the magnetic field generation parts 230 includes a core and a coil wrapping the core, and the magnetic field generation parts 230 may be arranged at the radially equal gaps on the sleeve 310 as a center shaft, i.e., at the circumferentially equal gaps. Each of the magnetic field generation parts 230 is applied with a current clockwise or counterclockwise to generate a magnetic field, and by the magnetic field, molten metal A located in the sleeve 310 may be vibrated successively along a circumferential direction of the sleeve 310 so that a microstructure may be controlled. In other words, when a magnetic flux of the magnetic field formed through the magnetic field generation parts 230 exerts an impact on the inside portion of the molten metal A, a part of the molten metal A is vibrated vertically and thus vertical intermittent vibration stirring may be performed without stirring such as rotating. Therefore, without rotation movement accompanied by turbulence of the molten metal, vibration movement accompanied by shaking of the molten metal is generated, so that intermittent vibration of the molten metal generated by the magnetic field impact may inhibit generation of dendrite, and the microstructure is controlled, thereby preventing the outside air that may be introduced when rotational stirring is performed by the electromagnetic field.

Referring to FIGS. 1 to 9, according to the embodiment of the present disclosure, the two-segment electromagnet semi-solid die-casting apparatus 10 may include a mold member 100 including a movable mold 110 and a fixed mold 120, the injection member 300 including the sleeve 310 and a plunger 320 and injecting the molten metal into the mold member 100, and the two-segment electromagnet stirring member 200 including the first electromagnetic stirring part 210 located at one end of the movable mold 110 and moved in conjunction with the movable mold 110 and the second electromagnetic stirring part 220 located at one end of the fixed mold 120. As the movable mold 110 is moved, the first electromagnetic stirring part 210 is moved to be coupled to the second electromagnetic stirring part 220 to surround the outer circumferential surface of the sleeve 310, and the two-segment electromagnet stirring member 200 performs electromagnetic stirring to the molten metal A located in the sleeve 310.

When describing the structure in detail, as the movable mold 110 is moved in a first direction toward the fixed mold 120, the mold member 100 is closed in mold as shown in FIG. 1, thereby having a cavity 130 in a shape of a product, and in order to eject a product B, the movable mold 110 is moved in a second direction, and thus the mold member 100 may be open in mold as shown in FIG. 2.

As shown in FIGS. 1 and 2, the two-segment electromagnet stirring member 200 includes the first electromagnetic stirring part 210 and the second electromagnetic stirring part 220, and the first electromagnetic stirring part 210 is located at a lower end of the movable mold 110 and is moved in a first or second direction together with the movable mold 110 in conjunction with the movable mold 110, thereby being coupled to or separated from the second electromagnetic stirring part 220 located at a lower end of the fixed mold 120. Therefore, as the first electromagnetic stirring part 210 and the second electromagnetic stirring part 220 are respectively located at the lower ends of the movable mold 110 and the fixed mold 120 to provide the two-segment electromagnet stirring member 200 that is coupled to or separated from each other in conjunction with mold closure or mold opening of the movable mold 110 and the fixed mold 120, regardless of replacement of the sleeve 310, the two-segment electromagnet stirring member 200 may be coupled to or separated from each other separately from the injection member 300, so that maintenance can be easily performed and an injection process can be improved.

The two-segment electromagnet stirring member 200 may include a cover part 240 to protect the first electromagnetic stirring part 210 and the second electromagnetic stirring part 220 from the outside space after ejection of the product from the mold member 100. Therefore, as shown in FIG. 9, when the mold member 100 is open in mold to eject the product B, clean the movable mold 110 and the fixed mold 120, and coat a releasing agent, the cover part 240 is located outside the first electromagnetic stirring part 210 and the second electromagnetic stirring part 220 so as to protect the two-segment electromagnet stirring member 200 from a cleaning agent and the releasing agent.

At this point, the two-segment electromagnet semi-solid die-casting apparatus 10 may include a product ejecting member (not shown) that ejects the product B manufactured from the mold member 100, and after ejection of the product B from the mold member 100, and may include a cleaning nozzle member 500 cleaning the fixed mold 120 and the movable mold 110. For example, the cleaning nozzle member 500 may include a nozzle 520 spraying the cleaning agent and an arm 510 connected to the nozzle 520 and moving the nozzle 520 upward, downward, forward, and rearward.

As shown in FIG. 4, the injection member 300 may be rotated at a predetermined angle and the sleeve 310 may be tilted, and after the molten metal is injected into the tilted sleeve 310, as shown in FIG. 3, the injection member may stand upright and then be inserted into the mold member through a lower end of the mold member 100. For example, a rotation support shaft 340 may be provided at a lower end of the injection member 300, and a rotating driving cylinder 350 may be provided at one side portion of the injection member 300. When the rotating driving cylinder 350 is operated to allow a cylinder rod **350*a* to extend, the injection member 300 is rotated at the predetermined angle on the rotation support shaft 340 and the sleeve 310 may be tilted at a predetermined angle, and the molten metal A may be injected into the tilted sleeve 310. When injecting of the molten metal A is completed, the cylinder rod 350*a* is contracted and the sleeve 310 stands upright together with the injection member 300 and may be inserted into the mold member 100 through the lower end of the mold member 100. In other words, as the movable mold 110 is moved the first direction, the movable mold 110 is coupled to the fixed mold 120, the mold member 100 is closed in mold and the cavity 130 is provided in a shape of a product, and simultaneously, as the first electromagnetic stirring part 210 is moved in the first direction in conjunction with the movable mold 110, and the first electromagnetic stirring part 210 may be coupled to the second electromagnetic stirring part 220. At this point, the sleeve 310 is inserted into the mold member 100 through the lower end of the mold member 100 and the sleeve 310 may be docked to the mold member 100 while being coupled to the mold member 100 such that the inner wall 202 of the two-segment electromagnet stirring member 200 surrounds the outer circumferential surface of the sleeve 310, and the two-segment electromagnet stirring member 200 may perform electromagnetic stirring to the molten metal A located in the sleeve 310. Therefore, when the sleeve 310 is docked or undocked with respect to the mold member 100, impacts and damages to the two-segment electromagnet stirring member 200 can be prevented, and as such, electromagnetic vibration is efficiently provided into the molten metal A located in the sleeve 310**, so that improved quality of the molded product B can be maintained constant by controlling the structure of the molten metal A.

The injection member 300 includes a coupling-type sleeve removing tool (not shown) located at one end of an injection rod 360, and as the sleeve removing tool pushes the sleeve 310 upwards, the sleeve 310 may be uncoupled from the injection member 300. Therefore, during the injection process, even when defects or damages occur to the sleeve 310, it is possible to efficiently replace the sleeve 310 with the sleeve removing tool, which is an advantage. Furthermore, regardless of the replacement process of the sleeve 310, the two-segment electromagnet stirring member 200 is provided separately from the injection member 300, so that maintenance can be easily performed and an injection process can be improved.

Moreover, the two-segment electromagnet semi-solid die-casting apparatus 10 may include a sleeve releasing jig (not shown) located at an upper portion of the injection member 300, and as the sleeve 310 pushed upwards by the sleeve removing tool and the sleeve releasing jig are coupled to each other, the sleeve 310 may be separated from the injection member 300. Therefore, the sleeve replacement operation can be efficiently performed.

Referring to FIGS. 6 to 10, according to the embodiment of the present disclosure, a two-segment electromagnet semi-solid die-casting method includes injecting the molten metal A into the sleeve 310 of the injection member 300 first, at S110. The injecting the molten metal into the sleeve 310 by the injection member may be performed by rotating the injection member 300 at the predetermined angle to tilt the sleeve 310 (*a*), and injecting the molten metal A into the tilted sleeve 310 (*b*), and then making the injection member stand upright (c). For example, when the rotating driving cylinder 350 provided at one portion of the injection member 300 is operated to extend the cylinder rod **350*a*, the injection member 300 is rotated at the predetermined angle on the rotation support shaft 340 provided at the lower end of the injection member 300, so that the sleeve 310 may be tilted at the predetermined angle. After then, when the molten metal A is injected into the tilted sleeve 310 and injection of the molten metal A is completed, the cylinder rod 350*a* is contracted and the sleeve 310 may stand upright together with the injection member 300**.

Figure 6:
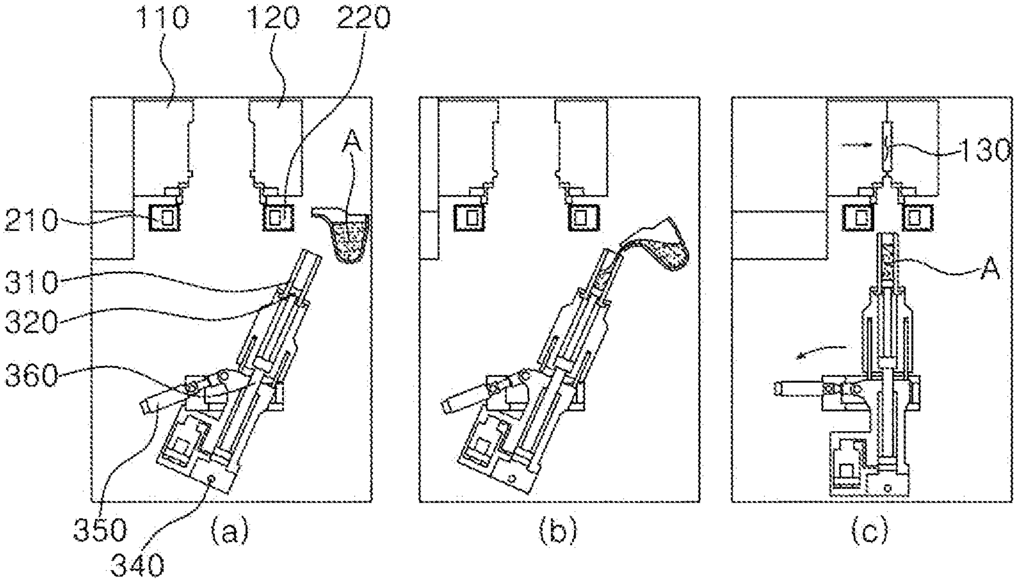
FIGS. 6 to 9 are sectional views showing a two-segment electromagnet semi-solid die-casting process according to an embodiment of the present disclosure.
Figure 7:
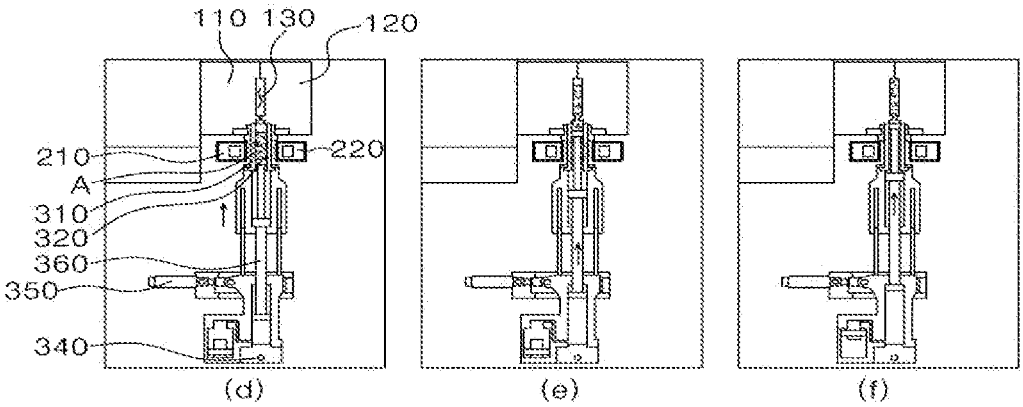
Figure 8:
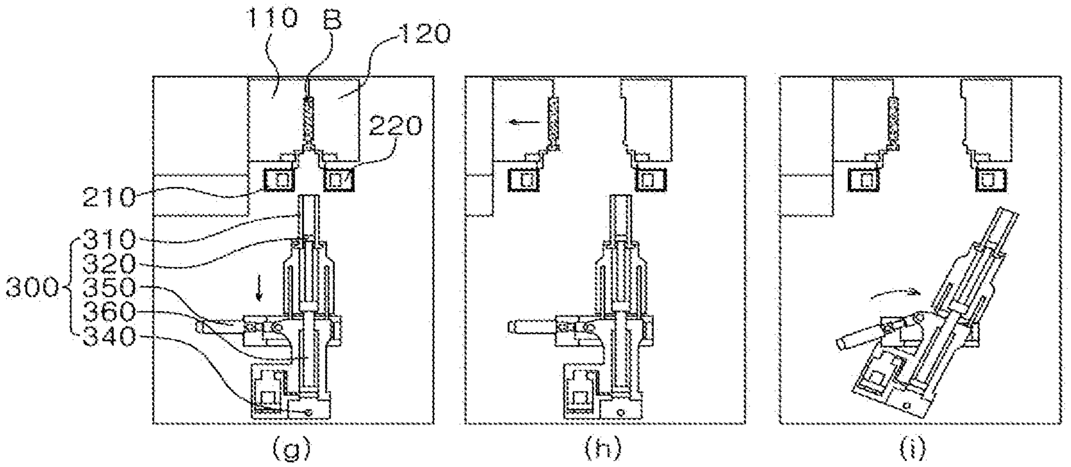

Next, the movable mold 110 of the mold member 100 is moved in the first direction to be coupled to the fixed mold 120 to be closed in mold (c), and the first electromagnetic stirring part 210 located at one end of the movable mold 110 is moved in conjunction with the movable mold 110 and may be coupled to the second electromagnetic stirring part 220 located at one end of the fixed mold 120, at S120. At this point, the injecting of the molten metal into the sleeve 310 at S110 and the coupling of the mold member 100 and the two-segment electromagnet stirring member 200 at S120 may be performed simultaneously, as shown in FIG. 6.

The coupling of the first electromagnetic stirring part 210 and the second electromagnetic stirring part 220 may be performed such that the plurality of magnetic field generation parts 230 is located at the radially equal gaps around the sleeve 310. The first electromagnetic stirring part 210 may be coupled to the second electromagnetic stirring part 220 to form the ring-shaped two-segment electromagnet stirring member 200 having a hollow portion. At this point, the two-segment electromagnet stirring member 200 may have the casing **200*a* as the first electromagnetic stirring part 210 and the second electromagnetic stirring part 220 are coupled to each other. The casing 200*a* may be formed in a ring shape including the inner wall 202 into which the sleeve 310 of the injection member is inserted and the outer wall 204 spaced apart from the inner wall 202. Furthermore, in order to protect the plurality of magnetic field generation parts 230 located inside the casing 200*a* from the outside space, the casing 200*a* may be formed such that the first electromagnetic stirring part 210 and the second electromagnetic stirring part 220 may be coupled to each other so as to seal the magnetic field generation parts 230**.

Next, the sleeve 310 is inserted into the mold member 100 through the lower portion of the mold member 100 while passing through the hollow portion of the two-segment electromagnet stirring member 200, and the two-segment electromagnet stirring member 200 located to surround the outer circumferential surface of the sleeve 310 may perform electromagnet stirring with respect to the molten metal at S130. In other words, when the sleeve 310 passes through the hollow portion formed by the inner wall 202 of the casing and is inserted into the mold member 100, the two-segment electromagnet stirring member 200 may start generating electromagnetism (d). In the magnetic field generation parts 230 arranged at the radially equal gaps on the sleeve 310 as the center shaft, i.e., arranged at circumferentially equal intervals, each of the magnetic field generation parts is applied with a current clockwise or counterclockwise to generate a magnetic field, and the molten metal A located in the sleeve 310 is vibrated in a circumferential direction of the sleeve 310 sequentially by the magnetic field so that the microstructure of the molten metal A. In other words, the magnetic flux of the magnetic field formed by the magnetic field generation parts exerts an impact on the inside portion of the molten metal, and a part of the molten metal is vibrated vertically, so that vertical intermittent vibration stirring may be performed without stirring such as rotating. Therefore, without rotation accompanied by turbulence of the semi-solid molten metal, vibration movement accompanied by shaking of the molten metal is generated, so that intermittent vibration of the molten metal generated by the magnetic field impact may inhibit generation of dendrite, and the microstructure is controlled, thereby preventing the outside air that may be introduced when rotational stirring is performed by the electromagnetic field.

Next, the plunger 320 is moved the electromagnetic-stirred molten metal A may be injected into the mold member 100 (*e*) and may be pressurized (f) at S140. In other words, as the injection rod 360 is raised and thus the plunger rod coupled to an end of the injection rod 360 is raised, the plunger 320 may inject the molten metal A into the cavity 130 of the mold member 100 (*e*), and the two-segment electromagnet stirring member 200 may maintain magnetic field generation until injection into the cavity 130 is completed. When pressuring the molten metal into the mold member 100 starts with completion of upward movement of the plunger 320 (*f*), electromagnetism generation of the two-segment electromagnet stirring member 200 may be completed.

Next, the mold member 100 is open in mold and the product B may be ejected from the mold member 100 at S140. When formation of the product is completed, the plunger 320 is lowered, and the injection member 300 may be undocked from the mold member 100 (*g*). After then, as the movable mold 110 is moved in the second direction, the movable mold 110 is separated from the fixed mold 120 so that the mold member 100 may be open in mold (h), and the first electromagnetic stirring part 210 is also separated from the second electromagnetic stirring part 220 in conjunction with movement of the movable mold 110, and may be moved in the second direction together with the movable mold 110. Furthermore, the injection member 300 may be tilted at the predetermined angle (i).

After then, the product ejecting member located at one side portion of the mold member is operated and the product may be ejected (j), and the movable mold and the fixed mold may be cleaned (k), and the releasing agent may be coated at S160.

After the ejecting of the product B, before the cleaning of the mold member 100, the method may include moving the cover part 240 to the outside space of the first electromagnetic stirring part 210 and the second electromagnetic stirring part 220 to protect the two-segment electromagnet stirring member 200 at S150. In order to prevent the cleaning agent sprayed during cleaning of the mold member 100 and a chemical sprayed during coating of the releasing agent to affect the two-segment electromagnet stirring member 200, before the mold member 100 is cleaned (k), the cover part 240 is moved, so that the outside space of the two-segment electromagnet stirring member 200 may be protected.

Furthermore, the cleaning nozzle member 500 is provided above the mold member 100, so that after the product is ejected from the mold member 100, cavity regions of the fixed mold 120 and the movable mold 110 may be cleaned. In this case, the method may include cleaning the tilted sleeve 310 by using a sleeve cleaning member 600.

According to the embodiment of the present disclosure, the two-segment electromagnet semi-solid die-casting apparatus and the die-casting method using the same can have the advantage of controlling the structure of the molten metal while preventing impacts and damages to the two-segment electromagnet stirring member 200 during docking and undocking of the sleeve 310 with respect to the mold member 100 and efficiently providing electromagnetic vibration into the molten metal A in the sleeve 310.

Furthermore, as the first electromagnetic stirring part 210 and the second electromagnetic stirring part 220 are respectively located at the lower portions of the movable mold 110 and the fixed mold 120 and the two-segment electromagnet stirring member 200 operated in conjunction with mold closure and mold opening of the movable mold 110 and the fixed mold 120 is provided, regardless of replacement of the sleeve 310, the two-segment electromagnet stirring member 200 can be coupled to or uncoupled from each other, so that the injection process can be improved.

Hereinabove, although the preferred embodiments of the present disclosure have been disclosed for illustrative purpose, those skilled in the art will appreciate that various modifications, additions and substitutions are possible, without departing from the scope and spirit of the present disclosure as disclosed in the accompanying claims.

DESCRIPTION OF REFERENCE NUMERALS

10: two-segment electromagnet semi-solid die-casting apparatus
100: mold member
110: movable mold
120: fixed mold
130: cavity
200: two-segment electromagnet stirring member
200*a*: casing
202: inner wall
204: outer wall
210: first electromagnetic stirring part
220: second electromagnetic stirring part
230: magnetic field generation units
240: cover part
300: injection member
310: sleeve
320: plunger
340: rotation support shaft
350: driving cylinder
360: injection rod
500: cleaning nozzle member
600: sleeve cleaning member
A: molten metal
B: product.

The invention claimed is:

1. A two-segment electromagnet semi-solid die-casting apparatus comprising:
a mold member comprising a movable mold and a fixed mold;
an injection member comprising a sleeve and a plunger and configured to inject molten metal into the mold member; and a two-segment electromagnet stirring member comprising a first electromagnetic stirring part and a second electromagnetic stirring part, the first electromagnetic stirring part being located at one end of the movable mold and being configured to be moved in conjunction with the movable mold and the second electromagnetic stirring part being located at one end of the fixed mold, wherein the first electromagnetic stirring part is configured to be moved with movement of the movable mold to be coupled to the second electromagnetic stirring part to surround an outer circumferential surface of the sleeve, and the two-segment electromagnet stirring member is configured to perform electromagnetic stirring to the molten metal located in the sleeve.

2. The two-segment electromagnet semi-solid die-casting apparatus of claim 1, wherein the two-segment electromagnet stirring member comprises a cover part, the cover part being configured to protect the first electromagnetic stirring part and the second electromagnetic stirring part from outside space after a product is ejected from the mold member.

3. The two-segment electromagnet semi-solid die-casting apparatus of claim 1, wherein the injection member is rotated at a predetermined angle and thus the sleeve is tilted, and after the molten metal is injected into the tilted sleeve, the injection member stands upright and is inserted into the mold member through a lower end of the mold member.

4. A two-segment electromagnet semi-solid die-casting method comprising:

injecting molten metal into a sleeve of an injection member;

moving and coupling a movable mold of a mold member to a fixed mold, and allowing a first electromagnetic stirring part located at one end of the movable mold to be moved in conjunction with the movable mold to couple the first electromagnetic stirring part to a second electromagnetic stirring part located at one end of the fixed mold, thereby forming a ring-shaped two-segment electromagnet stirring member having a hollow portion;

inserting the sleeve into the mold member through a lower portion of the mold member while passing through the hollow portion of the two-segment electromagnet stirring member, and allowing the two-segment electromagnet stirring member located to surround an outer circumferential surface of the sleeve to perform electromagnetic stirring to the molten metal; and injecting the electromagnetic stirred molten metal into the mold member as a plunger is moved.

5. The two-segment electromagnet semi-solid die-casting method of claim 4, wherein the coupling of the first electromagnetic stirring part and the second electromagnetic stirring part is performed by positioning a plurality of magnetic field generation parts at radially equal gaps around the sleeve.

6. The two-segment electromagnet semi-solid die-casting method of claim 4, wherein the two-segment electromagnet semi-solid die-casting method comprises:

ejecting a product from the mold member and cleaning the movable mold and the fixed mold, and coating a releasing agent, wherein before the cleaning of the movable mold and the fixed mold or the coating with the releasing agent, the method comprises: moving a cover part to outside space of the first electromagnetic stirring part and the second electromagnetic stirring part to protect the two-segment electromagnet stirring member.

7. The two-segment electromagnet semi-solid die-casting method of claim 4, wherein the injecting of the molten metal into the sleeve of the injection member is performed by rotating the injection member at a predetermined angle to tilt the sleeve, and injecting the molten metal into the tilted sleeve and then allowing the injection member to stand upright.

* * * * *